United States Patent

Taylor

[15] 3,697,862

[45] Oct. 10, 1972

[54] POWER SUPPLY HAVING MEANS FOR LIMITING LOAD CURRENTS WITH BOTH ACTIVE AND PASSIVE LOADS

[72] Inventor: Robert L. Taylor, Green Brook, N.J.

[73] Assignee: Hewlett-Packard Company, Palo Alto, Calif.

[22] Filed: June 15, 1971

[21] Appl. No.: 153,340

[52] U.S. Cl.........................323/9, 323/20, 323/22 T

[51] Int. Cl..................................................G05f 1/58

[58] Field of Search...........323/4, 9, 16, 19, 20, 22 T

[56] References Cited

UNITED STATES PATENTS

| | | | |
|---|---|---|---|
| 3,538,423 | 11/1970 | Goleniewski | 323/4 |
| 3,509,448 | 4/1970 | Bland | 323/9 |
| 3,581,224 | 5/1971 | Nercessian | 323/19 X |

*Primary Examiner*—A. D. Pellinen
*Attorney*—Stephen P. Fox

[57] ABSTRACT

A voltage regulated power amplifier has a bipolar output voltage capability and will drive either a passive or active load. First and second amplifier circuits respond respectively to positive and negative load currents of predetermined magnitudes to limit current at the output terminal of the power amplifier.

4 Claims, 2 Drawing Figures

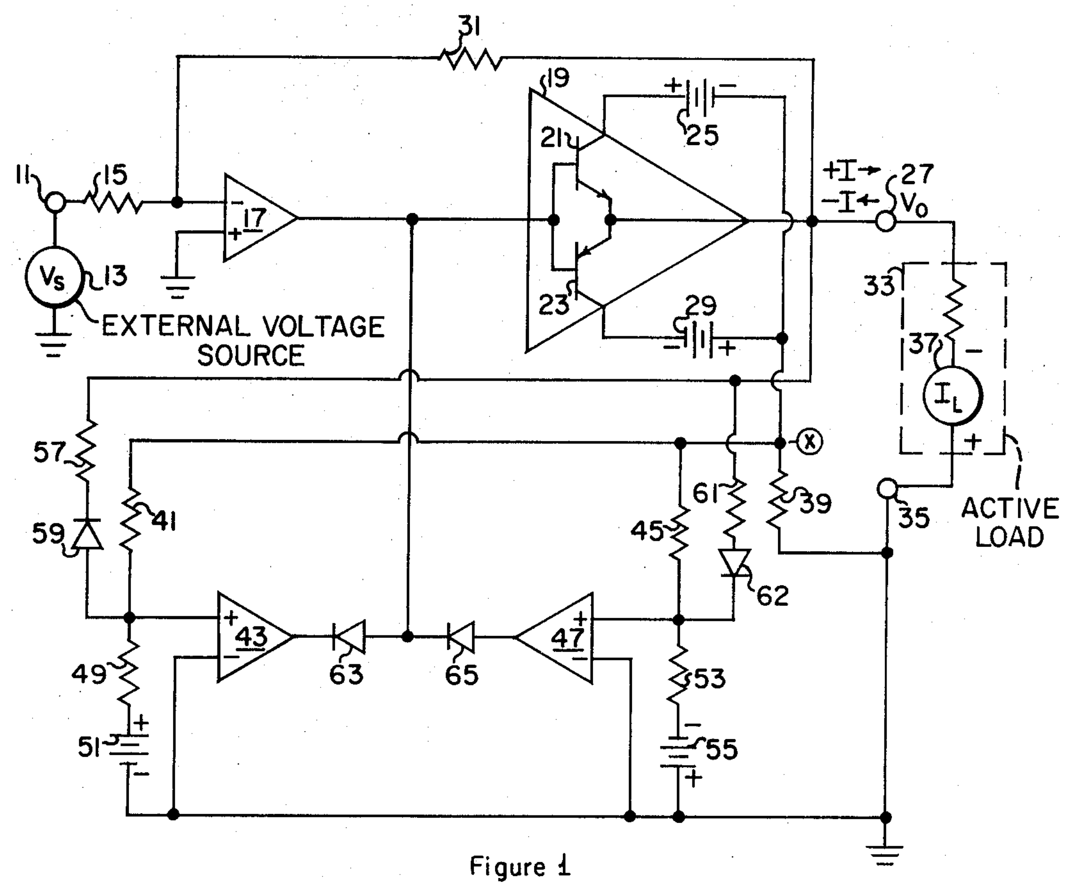
Figure 1
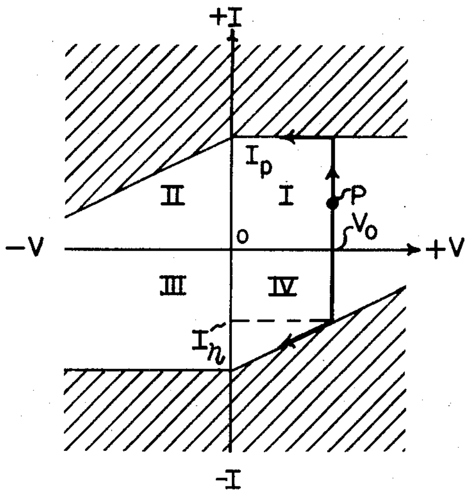
Fiqure 2
INVENTOR.
ROBERT L. TAYLOR
BY Stephen P. Fox
ATTORNEY

POWER SUPPLY HAVING MEANS FOR LIMITING LOAD CURRENTS WITH BOTH ACTIVE AND PASSIVE LOADS

BACKGROUND OF THE INVENTION

Voltage regulated power supplies are often used to drive loads which are active as well as passive. For purposes of the present description, a passive load may be of the resistive type whereas an active load is one which includes some type of power source. The power source may be, for example, a continuous source, such as a battery, or a transient source, such as a dischargeable capacitor. When a regulated power supply drives a passive load, the output transistors operate in a source mode to provide current to the load. Conversely, when an active load is coupled to the power supply, the output transistors may operate in a sinking mode, that is, they receive current from the load.

In heretofore known power supplies of the unprotected type, when the output transistors operate in the sinking mode, they conduct the load current while being subjected to voltage from the active load which adds to the internal transistor supply voltage. As a result, power dissipation in the transistors in the sinking mode of operation may be more than twice the dissipation during operation of the transistors in the source mode. The output transistors are generally selected with power ratings sufficiently high for a particular source mode application, in which case the sinking mode current must be no more than about one-half of the available source mode current output capacity to insure against transistor breakdown. The selection of output transistors to operate in the source mode at only a fraction of their power capability is obviously inefficient.

SUMMARY OF THE INVENTION

The present invention relates to a power supply that has the capability of providing dual polarity output voltages to either a passive or active load. The illustrated embodiment of the invention includes a voltage regulated power amplifier which is protected against overload currents in both the source and sinking modes of operation. Current at the load terminals is sensed and a signal proportional thereto is applied to first and second amplifier circuits. The first amplifier circuit responds to positive load current, i.e. current flowing out of the output terminal to a load, to drive the power amplifier out of voltage regulation when the load current exceeds a predetermined value, thereby to decrease the load voltage and thus limit the load current. The second amplifier circuit responds to negative load current, i.e. current flowing into the output of the power amplifier from an active load, to limit the negative load current in a manner similar to that of the first amplifier circuit. The first and second amplifier circuits are coupled to sense both the load current and load voltage and to drive the power amplifier by simplified circuitry which uses few components.

A significant advantage of the power supply of the present invention is that load current is limited to predetermined magnitudes in all four quadrants of the voltage-current graph that represents the operating output characteristics of the supply. Thus, more efficient and economical use is made of the output transistors in the power amplifier.

BRIEF DESCRIPTION OF THE DRAWINGS

FIG. 1 is a combined schematic and block diagram of the preferred embodiment of the invention.

FIG. 2 is a graph illustrating one mode of the load current limiting operation of the present invention.

DESCRIPTION OF THE PREFERRED EMBODIMENT

Referring now to FIG. 1, the power supply includes an input terminal 11 to which is applied a voltage $V_s$ from an external voltage source 13. The voltage $V_s$ may be a fixed reference voltage or the voltage from a programmable source such as could be controlled by a computer. The signal from voltage source 13 is applied through an input resistor 15 to the negative input of a differential amplifier 17. The positive input of amplifier 17 is referenced to ground potential. The output of amplifier 17 is coupled to the input of a power amplifier 19. Power amplifier 19 has a dual polarity output current capability, as indicated diagrammatically by two transistors 21, 23. Transistor 21 is of the NPN type and conducts current from a positive power source represented by battery 25 to an output terminal 27, while transistor 23 is of the PNP type and is coupled to a negatively poled battery 29 to control negative current at the output terminal. The base control inputs of transistors 21, 23 are coupled in parallel. A positive input current signal causes transistor 21 to conduct in an amplifying mode; whereas a negative input current signal causes transistor 23 to conduct in an amplifying mode. The positive and negative curents, +I and −I, produced by transistors 21, 23, respectively, are shown adjacent to terminal 27. The negative terminal of battery 25 and the positive terminal of battery 29 are connected in common to load current sensing circuitry hereinafter described.

The output signal from power amplifier 19 is coupled through a feedback resistor 31 to the negative input of amplifier 17, thereby to form a negative feedback circuit. With this arrangement, the output voltage $V_o$ at the output terminal 27 of power amplifier 19 is proportional to the voltage $V_s$ from source 13 which is applied to amplifier 17, and any fluctuations in the voltage $V_o$ are corrected by the negative feedback loop. Thus the output voltage $V_o$ is regulated and maintained at a value determined by the value of $V_s$.

A load 33 is coupled between output terminal 27 and a common or ground terminal 35. Load 33 may be of either the active type, as shown, or of the passive type. A passive load is typically one which includes only resistive elements with no current generating source. An active load includes some type of current generator, as represented diagrammatically by the current source 37. This current source may be a steady-state current generator such as a battery or it may be an energy storing element such as a capacitor or inductor. A positively charged capacitor, for example, produces a negative current while discharging. With the output voltage $V_o$ positive, a passive load receives positive current, +I, from amplifier 19; whereas in an active load of the type shown, the current source pumps current into the output terminal 27, that is, in the direction of the negative current, −I.

When both voltage and current at output terminal 27 are in the positive direction, amplifier 19 is operating in the source mode, and transistor 21 is conducting while transistor 23 is nonconducting. In this mode, the voltage across transistor 23 will be less than the voltage from the supply 29 as long as the output voltage $V_o$ is positive. When $V_o$ is positive, the voltage drop across transistor 21 is low and the voltage across the nonconducting transistor 23 is approximately equal to the sum of $V_o$ and the voltage of supply 29. This approaches twice the supply voltage 29, assuming that supply voltages 25, 29 are equal. If an active load causes the current at output terminal 27 to flow in the negative direction, the power amplifier 19 is operating in a sinking mode and transistor 23 is conducting while transistor 21 is nonconducting. In this situation, a high voltage approximately equal to $V_o$ plus the voltage of supply 29 appears across transistor 21. Such a high output voltage across output transistor 21 in the presence of high load current could obviously damage this transistor and cause secondary breakdown or overheating. Conversely, transistor 21 could be damaged when the load voltage $V_o$ is negative in the presence of positive load current.

In order to prevent the occurrence of high voltages across the conducting one of transistors 21, 23 as described above, the current in both positive and negative directions is limited at output terminal 27. Load current is sensed by a resistor 39 which is coupled between the load terminal 35 and the common junction of voltage supplies 25, 29. Resistor 39 provides a return current path from the load 33 to the transistors 21, 23 and has a low value, on the order of one ohm. Thus, the voltage across resistor 39 with respect to ground, i.e. the voltage at point X, is indicative of the load current.

The voltage at point X is applied through a resistor 41 to the positive input of a first differential amplifier 43, and through a resistor 45 to the positive input of a second differential amplifier 47. The negative inputs of the two amplifiers 43, 47 are connected to ground potential. Each of the resistors 41, 45 is part of a voltage divider network which establishes the input signal level to the amplifiers 43, 47. Specifically, resistor 41 forms a voltage divider with a resistor 49 and a source of positive reference potential 51. Similarly, resistor 45 forms a voltage divider with a resistor 53 and a negative reference potential source 55. In addition, during certain operating conditions, hereinafter described, the two voltage divider networks include additional legs which are connected to the output of power amplifier 19. The additional leg for the voltage divider network associated with amplifier 43 includes a resistor 57 and a diode 59 which are connected in series between the output terminal 27 and the input to amplifier 43. Similarly, the additional leg for amplifier 47 includes a series coupled resistor 61 and diode 62.

As described in more detail below, amplifier 43 responds to positive overload currents through load 33 to provide a compensatory current limiting signal through an asymmetrical conducting means such as a diode 63 to the input of power amplifier 19; whereas amplifier 47 responds to negative overload currents in the load to provide a compensating signal through diode 65 to the power amplifier input.

The over-all operation of the circuit of FIG. 1 may be understood with reference to the graph of FIG. 2. This graph illustrates the current as a function of the voltage at the output terminal 27. It will be assumed for the purpose of illustration that the power supply is operating initially in the source mode to supply a positive current to load 33 at a voltage which is regulated to maintain the value $V_o$. Under these conditions, the operating point P will be in quadrant I on the vertical line corresponding to the constant regulated voltage $V_o$. As the load impedance changes, the load voltage $V_o$ will remain constant; however, the load current will change. For example, as the load impedance decreases, the load current increases, thus moving the operating point P upward in the direction of the arrow on the vertical line in quadrant I. The increasing load current causes the voltage at point X (i.e. the voltage across the one ohm sensing resistor 39) to go more negative. Thus, the voltages at the inputs of both amplifiers 43, 47 go more negative. At this time, the input to amplifier 43 is positive, due to the selection of the voltage divider resistors 41, 49 and the positive polarity of the reference voltage 51; whereas the input to amplifier 47 is negative, due to the selection of resistors 45, 53 and the negative polarity of reference voltage 55. Diode 59 is reverse biased and diode 62 is forward biased, but the signal through the latter diode from the output terminal 27 is overridden by the controlling signal from point X applied through resistor 45 and the reference signal applied through resistor 53. Amplifier 43 produces a positive output which reverse biases diode 63, and amplifier 47 produces a negative output which reverse biases diode 65. Thus, amplifiers 43, 47 do not affect the input signal applied to power amplifier 19 when the operating point P is anywhere on the vertical regulated voltage line $V_o$ and within a permissible range of safe load currents. Only the feedback signal through resistor 31 and amplifier 17 operates to control the input of power amplifier 19 to maintain the load voltage constant.

As the load impedance decreases, the load current increases and the voltage at point X continues to go more negative. Ultimately, the load current reaches a level $I_p$ which is the predetermined maximum current level for safe operation of the output transistor 21. By this time, the negatively going signal at point X has caused the input signal of amplifier 43 to drop to about zero. When the maximum current $I_p$ is reached, the input to amplifier 43 goes slightly negative, which in turn rapidly causes the output of this amplifier to go negative, thereby forward biasing diode 63. Amplifier 43 is configured such that the output therefrom is substantially larger than the output from the voltage feedback amplifier 17, so that the signal from amplifier 43 causes the voltage at the input of power amplifier 19 to drop despite the attempt of amplifier 17 to regulate the output voltage at terminal 27. Thus, amplifier 43 pulls amplifier 19 out of operation in the voltage regulating mode and causes the voltage at the output terminal 27 to decrease, thereby to limit the load current at the predetermined value $I_p$ and protect the output transistor 21 against excessive power dissipation. As the load impedance continues to decrease, the operating point moves in the direction of the arrow on the horizontal line $I_p$ in FIG. 2. All during this current limiting operation, diode 65 is reverse biased, so amplifier 47 has no effect on the load voltage or current.

The next situation to be considered is where the load is again operating at point P and where the load is of the active type which produces a transient negative current pulse. In this case, the current source 37 in the active load may be a capacitor which discharges. Any increase in the load impedance will cause the load current to decrease toward zero along the regulated voltage line $V_o$. When the load becomes active, i.e. when a load capacitor begins discharging, a point may be reached where the current at output terminal 27 becomes negative, so that the operating point moves into quadrant IV of FIG. 2. At this point, the power amplifier 19 ceases operating in the source mode and begins operation in the sinking mode. That is, transistor 21 ceases conducting and transistor 23 begins conducting to control the load voltage and current. At point X in FIG. 1, the voltage signal goes positive. This positive going signal is applied to the inputs of both amplifiers 43, 47. Amplifier 43 produces a positive output signal which maintains diode 63 reverse biased so that this amplifier is effectively disconnected from the input to power amplifier 19. Initially, in quadrant I, diode 65 is also reverse biased because the input to amplifier 47 is initially negative due to the negative voltage from reference source 55 applied to the input of amplifier 47 through the voltage divider comprising resistors 45, 53. However, when the load operating point moves into quadrant IV, the positive load voltage is coupled through diode 62 and combines with the positive signal at point X and drives the input to amplifier 47 positive. The point at which the input to amplifier 47 becomes positive and produces a positive output signal to forward bias diode 65 corresponds to the maximum permissible negative load current $I_n$ shown in FIG. 2. Amplifier 47 then drives the input of power amplifier 19 more positive to reduce the conduction of transistor 23 and thus reduce the load current. The signal from amplifier 47 overrides the voltage regulating feedback signal through resistor 31 and amplifier 17 to take the load out of its voltage regulated mode of operation. As the current generated by the active load tends to increase, the operating point of the load moves in the direction of the arrow along the sloped line in quadrant IV of FIG. 2. This maintains the negative load current limited at a predetermined value to protect the output transistor 23 against excessive power dissipation.

The slope of the current limiting line in quadrant IV is determined by the value of resistor 61. The slope is chosen to maintain the power dissipation in transistor 23 within safe limits. As described above, the power dissipation of this transistor depends on the load current and the sum of the load voltage and the voltage of supply 29.

The above-described operation of the circuit in quadrants I and IV occurs in the case where the voltage source 13 applies a positive input signal to the terminal 11. When this voltage source provides a negative input signal, the voltage regulation and current limiting operation occurs in quadrants II and III in a manner similar to that described above with respect to quadrants I and IV. It can be seen that in quadrants I and II, transistor 21 is conducting; whereas in quadrants III and IV transistor 23 is conducting. Quadrants II and IV illustrate the current limiting operation for active loads, while quadrants I and III illustrate the current limiting operation for passive loads. In summary, load current is limited in both positive and negative directions within the range bounded by the shaded areas of FIG. 2. In comparing current limiting in quadrants I and II, for example, it can be seen that the maximum safe load current is lower in quadrant II than in quadrant I. This is because in quadrant II, the conducting transistor (i.e. transistor 21) is subjected to greater voltage than in quadrant I. Similar operation occurs for limiting power in transistor 23, as shown in quadrants III sand IV.

I claim:

1. A power supply for providing regulated bipolar load voltages and for limiting bipolar load currents, said power supply comprising:
   a power amplifier having an input terminal and a load terminal, said power amplifier being operable to provide dual polarity output voltages to said load terminal;
   feedback circuit means coupled between said load terminal and said input terminal for regulating the voltage at said load terminal;
   means for sensing load current applied to said load terminal; and
   first and second amplifier circuit means coupled to said sensing means and responsive to load current of one and the other of opposite polarities, respectively, for driving said power amplifier to decrease the magnitude of the voltage at said load terminal when said load current exceeds predetermined overload values, thereby to limit current at the load terminal of said power amplifier for both passive and active loads;
   each of said first and second amplifier circuit means including:
      an input terminal;
      first means for coupling said last named input terminal to said sensing means;
      second means for coupling said last named input terminal to said load terminal;
      reference voltage means including a resistor coupled to said last named input terminal for forming a voltage divider with said first and second coupling means;
      an output terminal; and
      asymmetrically conducting means for coupling said output terminal to the input terminal of said power amplifier.

2. The power supply of claim 1, wherein:
   said first coupling means includes a resistor;
   said second coupling means includes a resistor and a diode coupled in series;
   said diode, said reference voltage means and said asymmetrically conducting means of said first amplifier means being coupled in one polarity sense to control said power amplifier means in response to overload current supplied to a passive load from said load terminal; and
   said diode, said reference voltage means and said asymmetrically conducting means of said second amplifier means being coupled in a polarity sense opposite to said one polarity sense to control said power amplifier means in response to overload current supplied to said load terminal by an active load.

3. The power supply of claim 2, wherein:

said first and second amplifier means each includes an amplifier having a predetermined current output capacity; and said feedback circuit means includes inverting amplifier means for applying a negative feedback to the input terminal of said power amplifier, said inverting amplifier means having a maximum current output capacity less than that of the amplifiers of said first and second amplifier means.

4. The power supply of claim 1, wherein:

said first coupling means includes a resistor;

said second coupling means includes a resistor;

said reference voltage means and said asymmetrically conducting means of said first amplifier means being coupled in one polarity sense to control said power amplifier means in response to overload current supplied to a passive load from said load terminal; and said reference voltage means and said asymmetrically conducting means of said second amplifier means being coupled in a polarity sense opposite to said one polarity sense to control said power amplifier means in response to overload current supplied to said load terminal by an active load.

* * * * *